Oct. 9, 1962 J. V. RINNOVATORE ET AL 3,057,945
SOLID ELECTROLYTE BATTERY
Filed Dec. 4, 1959 2 Sheets-Sheet 1

*INVENTORS*
JAMES V. RINNOVATORE
KENNETH L. LAWS
BY
ATTORNEY

3,057,945
SOLID ELECTROLYTE BATTERY

James V. Rinnovatore, Philadelphia, and Kenneth L. Laws, Bryn Mawr, Pa., assignors to The Electric Storage Battery Company, a corporation of New Jersey
Filed Dec. 4, 1959, Ser. No. 857,341
8 Claims. (Cl. 136—83)

The present invention generally relates to a new and improved battery. More specifically, the present invention is concerned with a new and improved solid electrolyte battery.

Solid electrolyte batteries have shelf lives many times those of conventional batteries and, since the liquid electrolyte of conventional batteries is eliminated, they lend themselves to miniaturization. These characteristics make them extremely suitable for application in electronic devices which require currents in the microampere range.

Several solid electrolyte systems have been proposed. For example, it has been proposed to utilize silver halides as the solid crystalline electrolyte in combination with silver as the negative electrode and iodine in a suitable carrier as the positive electrode. Another prior art solid electrolyte battery comprises a negative electrode of either magnesium or aluminum, a crystalline solid electrolyte consisting of the salts of magnesium, potassium, or potassium admixed with aluminum, and a positive depolarizer electrode consisting of one of the conventional depolarizing materials in mixture with one of the salts of magnesium and potassium which are the solid state electrolytes. Still another suggested solid electrolyte battery utilizes lead as the positive electrode, lead chloride crystals as the solid electrolyte and oxygen absorbed on activated carbon as the negative electrode.

It is an object of the present invention to provide a new and improved solid electrolyte battery utilizing new materials adapted to provide a battery having characteristics not achieved with known systems.

It is another object of the present invention to provide a solid electrolyte battery which utilizes lead as the negative electrode, lead monoxide (PbO) as the solid electrolyte and oxygen as the positive electrode.

It is a further object of the present invention to provide a solid electrolyte battery which is photo-conductive, photovoltaic and which has rectification properties.

In accordance with the present invention there is provided a battery utilizing lead monoxide as the electrolyte. The active materials of the battery are metallic lead and gaseous oxygen. The lead monoxide is anodized on a wafer of lead with the latter serving as one electrode and electrical contact. A second electrical contact, which may be in the form of a screen or painted grid, is utilized for making contact with the other surface of the lead monoxide layer. By utilizing a screen or grid construction, an interface is provided between the oxygen in the atmosphere and the lead-monoxide layer. It should be noted, however, that it has been found applicable to utilize a porous wafer of activated carbon containing absorbed oxygen as the second contact. The constructions described provide a battery having an open circuit voltage of about 0.6 volt. In addition to its battery characteristics, the lead-lead monoxide cell described has been found to exhibit photoconductive and photovoltaic characteristics when the lead monoxide layer is subjected to illumination and directional conductivity properties. While the mechanisms responsible for these unique characteristics are not fully understood, it is believed that their operation can be explained in accordance with the accepted theory of the operation of a solid electrolyte cell and conventional semiconductor junction theory.

According to the theory of operation of a solid electrolyte cell, ions diffuse through a solid electrolyte layer where they combine with ions or atoms of another type. This separation of charge gives rise to a potential difference across the electrolyte layer. In the case of the battery of the present invention this means that either lead ions are diffused through the lead monoxide layer until they react with oxygen at the surface at the oxygen-lead monoxide interface or oxygen ions diffused through the layer until they react with lead at the lead-lead monoxide interface. It is, of course, theoretically possible that a combination of both these phenomenon may occur, however, for the purpose of the present disclosure it will be assumed that the lead ions are the diffusing ions.

There are several possible explanations for the other characteristics of a battery in accordance with the present invention. The photovoltaic effect can be explained on the basis that light alters the diffusion reaction producing the battery effect. The rectification properties can be explained on the basis of a junction existing between the lead monoxide layer and the top contact or at the lead-lead monoxide interface. The photoconductive characteristics can be explained on the basis of conventional semiconductor theory. All of these effects, however, are best explained by assuming that a p-n junction exists at the lead-monoxide layer parallel to and between the lead substrate and the top contact. In this respect it should be noted that an excess of lead near the surface of the layer in all probability produce such a junction. The excess lead atoms act as donor impurities, making the region near the lead an n-type material while the oxygen atoms act as acceptors, making the surface a p-type material.

A better understanding of the present invention may be had from the following description when read with reference to the accompanying drawings of which:

Figure 1:
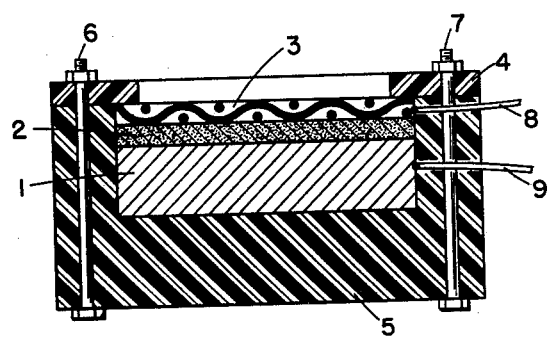
FIG. 1 is a cross-sectional view of one embodiment of the battery of the present invention.

Referring now to FIG. 1, the numeral 1 indicates a lead disc having a layer of lead monoxide 2 on one surface threof. An electrical contact is made with the lead monoxide layer 2 by means of a conductive screen 3 held in contact therewith by means of a ring of insulating material 4. The ring 4 together with cup 5, also of an insulating material, forms a container for the cell. As shown, the ring 4 may be fastened to the cup 5 by means of the bolts 6 and 7. Lead wires 8 and 9 from the screen 3 and lead disc 1, respectively, are provided for electrical contact with an external circuit. As mentioned hereinbefore, in the battery of the present invention the positive electrode is gaseous oxygen. By means of the construction just described the lead monoxide layer 2 is exposed to oxygen in the atmosphere through the interstices of the screen 3. It should be understood, however, that if there is a sufficient amount of oxygen absorbed in the lead monoxide layer that the battery effect to be described hereinafter can be achieved even if there is no clearly defined interface provided between the lead monoxide layer and the atmosphere or other source of oxygen. It should also be noted that in the embodiment of the present invention described above the lead monoxide layer is also adapted to be exposed to illumination through the interstices in the screen 3. Accordingly, this embodiment of the present invention is adapted to exhibit photoelectric characteristics.

In accordance with one method of producing a battery of a type shown in FIG. 1, lead is anodically oxidized in sulfuric acid at a constant potential. Specifically, a lead substrate is held at a potential of 0.60 volt with respect to a mercury-mercuric sulfate standard cell in sulfuric acid having a specific gravity of 1.180 for one to three weeks. The lead substrate then has a film of lead monoxide on one side which is in turn covered with a thin powdery film of lead sulfate. The lead sulfate is then physically removed from the lead monoxide film and the cell rinsed and dried with water and alcohol. When the cell has been dried, the unit is ready for assembly into a battery by making the electrical contacts with the lead and lead monoxide layers as described hereinbefore.

In addition to utilizing a conductive screen, several other methods have been found suitable for making contact with the lead monoxide layer. For example, it has been found possible to paint a grid on the lead monoxide layer using either a conductive silver paint or a colloidal graphite suspension. Still another method of making electrical contact with the lead monoxide layer is to evaporate semi-transparent layer of gold or other conductive metal thereon.

A battery produced by one of these methods thus consists of a lead substrate and another electrode with a layer of lead monoxide sandwiched between. The voltage produced by the battery is always such as to make the top contact positive with respect to the lead substrate. This voltage, which is generally about 0.6 volt, is independent of the thickness of the cell, its history, and the type and area of contact with the lead monoxide layer. As will be explained in more detail hereinafter, the open circuit voltage of the cell increases with a decrease in temperature and decreases radically after a D.C. or an A.C. voltage of greater than about two volts is applied thereto. The voltage of the cell increases to about 0.75 volt when subjected to strong illumination. The effective internal resistance of the cell as determined by current output for various load resistance varies radically with temperature and when the cell is illuminated it decreases by as much as two orders of magnitude.

Figure 2:
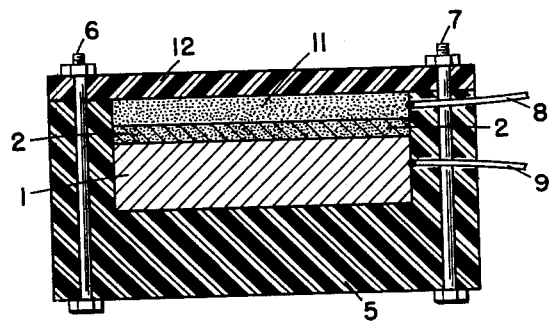
FIG. 2 is a cross-sectional view of a modification of the battery shown in FIG. 1.

Referring now to FIG. 2, there is shown a modification of the battery shown in FIG. 1 which is constructed so as to eliminate the photoelectric characteristics of the cell. Similar reference characters have been employed to designate components similar to those shown in FIG. 1. This embodiment of the present invention is the same as the embodiment shown in FIG. 1, except that contact with the lead monoxide layer 2 is made by means of a porous activated carbon block 11 which is held in contact therewith by means of a cover 12. In this construction the lead monoxide layer is shielded from light and hence the cell does not exhibit any photoelectric characteristics. The activated carbon block is chosen as the contact electrode because of its ability to absorb oxygen which is believed to constitute one of the electrochemically active materials of the couple.

The characteristics of a battery in accordance with the present invention for various environmental conditions are listed in Table I.

intensity of about 30-foot-candles. Illuminated indicates a light intensity of at least 1,000 foot-candles or higher produced by a 150 watt flood lamp placed about six inches from the cell. Where temperature variations are indicated, they were brought about by heating the cell over a hot plate or by immersing it in liquid nitrogen. Temperatures were measured with a thermocouple, placed in contact with the lead substrate. Vacuum measurements were achieved in a vacuum chamber, the pressures being measured by a cold cathode ionization gauge. Under vacuum conditions the temperature was lowered by immersing the vacuum chamber in liquid nitrogen and was raised either by radiation from a flood lamp or by heating the chamber with a Bunsen burner.

The values in column 1 are averaged for several cells produced by anodization for one week, as described hereinbefore, the cells having a colloidal graphite painted grid. Columns 2 and 3 illustrate cell performance before and after the application of a D.C. voltage of 3.0 volts directly across the cell. This data is included because it had been observed that such treatment had a temporary deleterious effect on the open circuit voltage of the cell. Both cells had a history of two weeks of heating, cooling and shorting prior to the taking of the data presented in columns 2 and 3. After the voltage had been applied briefly and removed, the cell voltage was close to zero, as shown in column 3, but then returned gradually to values of column 2 with a time constant of about 2 minutes. While the external voltage was being applied the cell resistance gradually decreased until the voltage was removed. For an applied voltage of 1.5 volts no such effect was observed. If a voltage larger than 3.0 volts is applied or if the same voltage is applied for a longer time, the recuperation time is longer. The same effects have been observed for the application of D.C. voltages of either polarity and also for applied A.C. voltages. The data in columns 4 and 5 is for a fresh cell before and after immersion directly into liquid nitrogen. This test was performed to study the effect of low temperatures on cell characteristics. The cell was shorted for various lengths of time while in liquid nitrogen. The open circuit voltages upon unshorting gradually returned to the values of column 5 in lengths of time depending upon the length of time the cell was shorted. When the cell was removed from liquid nitrogen, all values returned to approximately those of column 4.

The data in columns 6 through 10 is for cells having a history of cooling to the temperature of liquid nitrogen in a vacuum and shorting for about 12 hours. The data in column 6 was taken at room temperature at a pressure of about $10^{-6}$ mm. of mercury. The cell was heated by applying a Bunsen flame to the vacuum chamber in a pressure of about 0.1 mm. of air and the values in column 7 were measured. After 75 minutes with the temperature still above 100° C. and the pressure below $10^{-4}$ mm. of mercury, the measurements in column 8 were taken. At this point the cell had assumed a reddish color. As the

*Table I*

|  | 1 | 2 | 3 | 4 | 5 | 6 | 7 | 8 | 9 | 10 |
|---|---|---|---|---|---|---|---|---|---|---|
| Dark Voltage (volts) | .61 |  |  | .63 | .73 | .58 | .65 | .030 |  |  |
| Room light voltage (volts) | .67 | .63 | .008 | .67 | .81 | .59 | .65 | .032 | .0009 | .58 |
| Illuminated voltage (volts) | .76 | .72 | .18 | .73 | .75 | .70 | .65 | .072 | .023 | .72 |
| Dark output resistance (ohms) | $6 \times 10^5$ |  |  | $5 \times 10^5$ | $6 \times 10^5$ | $3 \times 10^7$ | $2 \times 10^5$ | $5 \times 10^5$ |  |  |
| Room light output resistance (ohms) | $2 \times 10^5$ | $5 \times 10^6$ | $1 \times 10^5$ | $2 \times 10^5$ | $1 \times 10^6$ | $2 \times 10^7$ | $2 \times 10^5$ | $5 \times 10^5$ | $5 \times 10^5$ | $3 \times 10^5$ |
| Illuminated output resistance (ohms) | $1 \times 10^4$ | $1 \times 10^5$ | $5 \times 10^4$ | $2 \times 10^4$ | $2 \times 10^4$ | $6 \times 10^6$ | $2 \times 10^5$ | $4 \times 10^5$ | $5 \times 10^5$ | $1 \times 10^7$ |
| Temperature (° C.) |  |  |  | 30 | −196 | 30 | 115 | 102 | 45 | 30 |
| Pressure (mm. of Hg) |  |  |  |  |  | $10^{-6}$ | .15 | $6 \times 10^{-5}$ | $10^{-6}$ | 760 |

The data listed in Table I is for a cell having a painted colloidal graphite grid. All measurements were made at light intensities designated Dark, Room Light and Illuminated. The dark condition was achieved by shielding the cell from all light. Room light represents a light cell was cooled all voltages decreased and the pressure also decreased. The data in column 9 is from this stage of treatment. The data in column 10 was taken after atmosphere had been admitted to the vacuum chamber at room temperature.

The resistance characteristics of a cell in accordance with the present invention for two conditions of illumination are shown in Table II.

Table II

| Cell Resistance | Dark | Illumination |
|---|---|---|
| Forward (ohms) | $2 \times 10^3$ | $7 \times 10^2$ |
| Back (ohms) | $4 \times 10^5$ | $2 \times 10^4$ |

The data in Table II is for a cell having a silver screen pressure contact. The cell had been anodized for one week.

Figure 3:
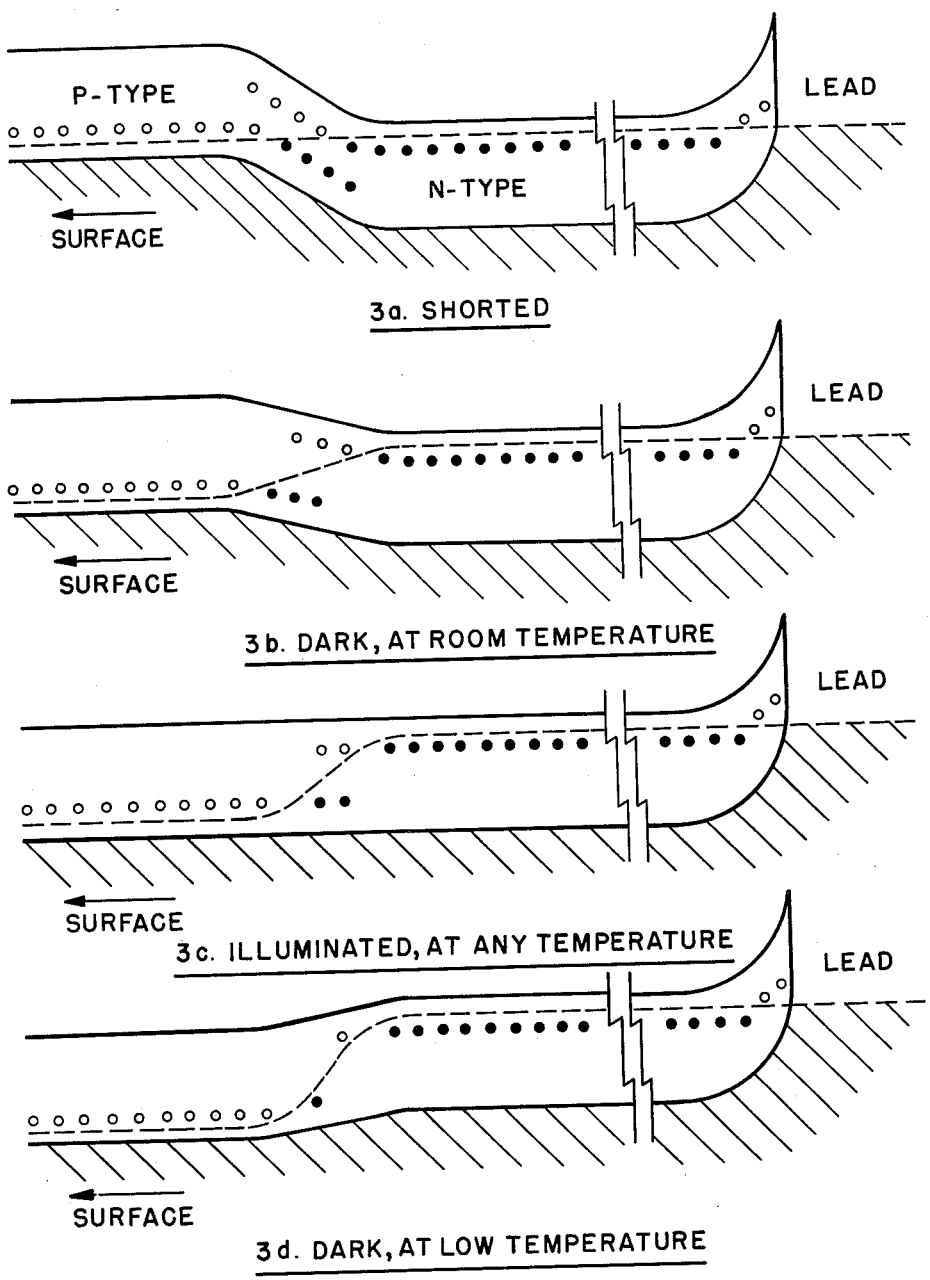
FIG. 3 is an energy band diagram of the lead monoxide region p-n junction of a battery in accordance with the present invention.

As stated hereinbefore, the photovoltaic, photoconductive, and rectifying characteristics of a battery in accordance with the present invention can be best explained by assuming that a p-n junction exists in the lead monoxide layer parallel to and between the lead substrate and the top contact. Referring now to FIG. 3, there are shown energy band diagrams of such a lead monoxide region p-n junction under various conditions of temperature and illumination. FIG. 3a represents the energy band diagram for a cell when it is shorted. The Fermi levels, represented by the dotted line, are equal on both sides of the junction. The circles represent empty donor or acceptor levels; the dots filled levels. This diagram would also apply to an unshorted p-n junction, if there were no battery voltage effect present. FIG. 3b shows the bands when a battery effect exists. The potential difference between the surface and the lead results in a difference of Fermi levels in the two regions. The potential difference observed is of such a polarity that the lead is negative. This fact implies that the average energy of the electrons is higher near the lead interface than at the surface, thus producing the shift in Fermi level shown in the diagram.

The effect of incident light is shown in FIG. 3c. According to the normal photovoltaic explanation, light creates hole-electron pairs by raising electrons up to the conduction band from the valence band on either side of the junction. However, the electrons and holes can both be trapped by the impurity levels except in the region of the junction, where the trapping centers are already ionized. In this region an electron raised to the conduction band by light may fall into one of the empty donor levels, while the hole left in the valence band may "drop up" into one of the filled acceptor levels. Thus the Fermi levels are shifted farther apart, producing an increase in the voltage. It has been noted that the battery effect voltage increases when the cell is cooled to liquid nitrogen temperature. This produces a further spread in the separation of the Fermi levels, as shown in FIG. 3d. In this case, it can be seen that an electron excited by light will tend to drift downhill in energy towards the p-type side of the junction, where it will fill one of the empty acceptor levels, thus again producing the configuration shown in FIG. 3c. It is felt that this explains the decrease in voltage of the cell with light, when the cell is at a low temperature. It can be seen that the proper polarity of rectification is predicted by the p-n barrier as shown in the diagrams. The forward direction of current flow, or the direction of least resistance, occurs when the surface is made positive, which decreases the barrier. Conversely, when the lead is made positive, the barrier is increased. The observed photoconductivity could be caused either by the common bulk semi-conductor mechanism or by a barrier effect. In the latter, the effect of lowering the barrier by light could increase the conductivity. It can be seen that in this mechanism one would expect that the photoconductivity would be greater when the voltage is applied of such polarity as to make the lead positive. Under this condition, the effect of decreasing the barrier with light would be more than if the lead were negative. This is verified by experiment.

The effect of heating has generally been to destroy all photoelectric effects, thus indicating that the p-n junction must have been destroyed. This supports the theory that the photovoltaic effect is essentially separate from the battery effect. The change in the physical appearance of the cell indicates a change in the physical characteristics of the lead monoxide layer.

What is claimed is:

1. A solid electrolyte battery comprising a cathode of solid metallic lead, an anode of oxygen and an electrolyte of crystalline lead monoxide.

2. A battery comprising a body of lead, a layer of tetragonal lead monoxide anodized on said lead, and oxygen.

3. Battery as specified in claim 2, wherein said oxygen is absorbed in said lead monoxide layer.

4. Battery as specified in claim 2, wherein said oxygen is absorbed in activated carbon.

5. Battery as specified in claim 2, wherein said layer of lead monoxide is exposed to the atmosphere.

6. A battery comprising a negative electrode of solid metallic lead, a positive electrode of gaseous oxygen, and an electrolyte comprising a layer of crystalline lead monoxide anodized on said metallic lead, an electrical contact being made with the surface of said lead monoxide layer by conductor means selected from the group consisting of a conductive metallic screen, a painted conductive grid, an evaporated metallic layer and activated carbon.

7. A solid electrolyte battery having photovoltaic, photoconductive and rectifying properties comprising a body of solid metallic lead, a layer of lead monoxide in the form of a solid on one surface of said lead, and a light transmitting electrical contact on said layer of lead monoxide.

8. Battery as specified in claim 7, wherein a source of oxygen is in contact with said layer of lead monoxide.

References Cited in the file of this patent

UNITED STATES PATENTS

| 487,644 | Rogers | Dec. 6, 1892 |
| 711,614 | Boitzke | Oct. 21, 1902 |
| 2,697,736 | Goldberg et al. | Dec. 21, 1954 |

FOREIGN PATENTS

| 126,766 | Great Britain | May 6, 1919 |

OTHER REFERENCES

Thompson: Trans. Electrochemical Soc., vol. 68, page 172, 1955.